US012677199B2

(12) United States Patent
Wang

(10) Patent No.: US 12,677,199 B2
(45) Date of Patent: Jul. 7, 2026

(54) REDIRECTION FAILURE PROCESSING METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventor: Jieping Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 421 days.

(21) Appl. No.: 18/347,857

(22) Filed: Jul. 6, 2023

(65) Prior Publication Data

US 2023/0362757 A1 Nov. 9, 2023

Related U.S. Application Data

(63) Continuation of application No. PCT/CN2022/072580, filed on Jan. 18, 2022.

(30) Foreign Application Priority Data

Jan. 20, 2021 (CN) .......................... 202110075875.8

(51) Int. Cl.
*H04W 36/00* (2009.01)
*H04W 36/06* (2009.01)

(52) U.S. Cl.
CPC ....... *H04W 36/0079* (2018.08); *H04W 36/06* (2013.01)

(58) Field of Classification Search
CPC ............. H04W 36/0079; H04W 36/06; H04W 36/00833; H04W 36/22; H04W 28/08;
(Continued)

(56) References Cited

U.S. PATENT DOCUMENTS

2008/0101311 A1* 5/2008 Bernhard .............. H04W 36/24
370/342
2010/0113020 A1 5/2010 Subramanian et al.
(Continued)

FOREIGN PATENT DOCUMENTS

CN 103327554 A 9/2013
CN 106034339 A 10/2016
(Continued)

OTHER PUBLICATIONS

Intel Corporation, "Further discussion on HO requirements of NR-U", 3GPP TSG-RAN WG4 Meeting #94-e, R4-2000393, Feb. 24, 2020-Mar. 6, 2020, Electronic meeting.

*Primary Examiner* — Kibrom T Hailu
(74) *Attorney, Agent, or Firm* — Price Heneveld LLP

(57) ABSTRACT

This application discloses a redirection failure processing method and apparatus, an electronic device, and a readable storage medium, and pertains to the field of communication technologies. The method includes: obtaining target information of N first cells in a case that a blind redirection message is received for a preset number of times within a preset time, where the N first cells are N cells that can be searched by a first electronic device, the target information is used to determine an access priority of each of the N first cells, and N≥1; and accessing a target cell, where the target cell is a cell with a highest access priority in the N first cells, and access priorities of the N first cells are determined based on an access success rate of each of the N first cells in a blind redirection process.

16 Claims, 3 Drawing Sheets

600

(58) Field of Classification Search
CPC ......... H04W 36/0011; H04W 36/0055; H04W
36/305
See application file for complete search history.

(56) References Cited

U.S. PATENT DOCUMENTS

| | | | |
|---|---|---|---|
| 2013/0183981 A1 | 7/2013 | Singh et al. | |
| 2014/0228029 A1* | 8/2014 | Wen .................... | H04W 36/245 |
| | | | 455/436 |
| 2016/0088529 A1* | 3/2016 | Yoon .................... | H04W 88/06 |
| | | | 455/436 |
| 2016/0286444 A1* | 9/2016 | Wang .................... | H04W 36/22 |

FOREIGN PATENT DOCUMENTS

| | | | |
|---|---|---|---|
| CN | 107809775 A | 3/2018 |
| CN | 111698748 A | 9/2020 |
| CN | 112888026 A | 6/2021 |
| JP | 2004120080 A | 4/2004 |
| WO | 2013019288 A1 | 2/2013 |

* cited by examiner

A redirection failure processing apparatus obtains target information of N first cells in a case that a blind redirection message is received for a preset number of times within a preset time 201

The redirection failure processing apparatus accesses a target cell 202

REDIRECTION FAILURE PROCESSING METHOD AND APPARATUS, ELECTRONIC DEVICE, AND READABLE STORAGE MEDIUM

CROSS-REFERENCE TO RELATED APPLICATIONS

This application is a continuation application of PCT International Application No. PCT/CN2022/072580 filed on Jan. 18, 2022, which claims priority to Chinese Patent Application No. 202110075875.8, filed on Jan. 20, 2021 in China, which are incorporated herein by reference in their entireties.

TECHNICAL FIELD

Embodiments of this application relate to the field of communication technologies, and in particular, to a redirection failure processing method and apparatus, an electronic device, and a readable storage medium.

BACKGROUND

When network load of a cell is too heavy, in order to balance the network load of the cell, the cell sends a blind redirection message to an electronic device connected to the cell, and the electronic device accesses another cell after receiving the blind redirection message.

In the related art, after receiving the blind redirection message, the electronic device selects a new cell for access based on a radio resource control (radio resource control, RRC) historical record. If the electronic device cannot camo on the newly accessed cell due to some reason (for example, a frequency power of the newly accessed cell is low), the electronic device may re-access the original cell.

However, if the network load of the original cell is still too heavy, the original cell sends a blind redirection message to the electronic device again. As a result, the electronic device fails in redirection and cannot be connected to a network.

SUMMARY

According to a first aspect, an embodiment of this application provides a redirection failure processing method. The method includes: obtaining target information of N first cells if a first electronic device receives a blind redirection message for a preset number of times within a preset time, where the N first cells are N cells that can be searched by the first electronic device, the target information is used to determine an access priority of each of the N first cells, and N≥1; and accessing a target cell, where the target cell is a cell with a highest access priority in the N first cells, and access priorities of the N first cells are determined based on an access success rate of each of the N first cells in a blind redirection process.

According to a second aspect, an embodiment of this application further provides a redirection failure processing apparatus. The apparatus includes an obtaining module and an access module, where the obtaining module is configured to obtain target information of N first cells if a first electronic device receives a blind redirection message for a preset number of times within a preset time, where the N first cells are N cells that can be searched by the first electronic device, the target information is used to determine an access priority of each of the N first cells, and N≥1; and the access module is configured to access a target cell, where the target cell is a cell with a highest access priority in the N first cells, and access priorities of the N first cells are determined based on an access success rate of each of the N first cells in a blind redirection process.

According to a third aspect, an embodiment of this application provides an electronic device, including a processor, a memory, and a program or an instruction that is stored in the memory and that can run on the processor, where when the program or the instruction is executed by the processor, the steps of the redirection failure processing method in the first aspect are implemented.

According to a fourth aspect, an embodiment of this application provides a readable storage medium, where the readable storage medium stores a program or an instruction, and when the program or the instruction is executed by a processor, the steps of the method in the first aspect are implemented.

According to a fifth aspect, an embodiment of this application provides a chip. The chip includes a processor and a communication interface, the communication interface is coupled to the processor, and the processor is configured to run a program or an instruction to implement the method in the first aspect.

According to a sixth aspect, an embodiment of this application provides a computer program product, where the computer program product is executed by at least one processor to implement the method in the first aspect.

DESCRIPTION OF EMBODIMENTS

Figures 1, 2:
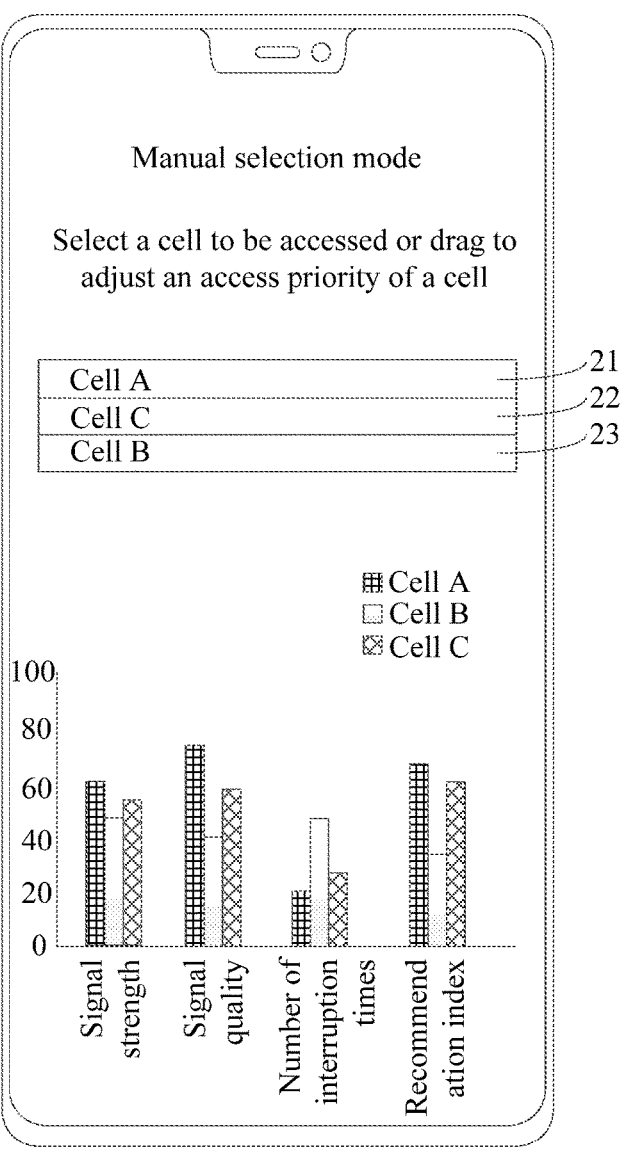
FIG. 1 is a schematic flowchart of a redirection failure processing method according to an embodiment of this application.
FIG. 2 is a schematic diagram of an interface to which a redirection failure processing method is applied according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

A redirection failure processing method provided in the embodiments of this application may be applied to a scenario in which an electronic device performs redirection after receiving a blind redirection message.

In the related art, a cell on which an electronic device camps sends a blind redirection message to the electronic device due to heavy network load. After the electronic device receives the blind redirection message, if a newly accessed cell does not support camping of the electronic device, the electronic device re-accesses the original cell. If the network load of the original cell is still heavy in this case, the electronic device receives a blind redirection message again, and because the cell in which the electronic device is redirected in a short time remains unchanged according to a preset rule, the electronic device may be switched between the two cells for a plurality of times. As a result, the electronic device cannot camp on the cell for a long time, and then the electronic device is disconnected from a network.

In the technical solutions provided in the embodiments of this application, when an electronic device receives a blind redirection message for a preset number of times within a preset time, it indicates that a redirection failure continuously occurs on the electronic device. In this case, to prevent the electronic device from being disconnected from a network, the electronic device actively searches for a nearby cell and selects a cell with a highest access priority for access, thereby improving redirection reliability of the electronic device and avoiding a network disconnection.

With reference to the accompanying drawings, the redirection failure processing method provided in the embodiments of this application is described in detail by using specific embodiments and application scenarios.

As shown in FIG. 1, an embodiment of this application provides a redirection failure processing method. The method may include the following step 201 and step 202:

Step 201: A redirection failure processing apparatus obtains target information of N first cells in a case that a blind redirection message is received for a preset number of times within a preset time.

The N first cells are N cells that can be searched by a first electronic device, the target information is used to determine an access priority of each of the N first cells, and N≥1.

For example, when network load of a cell on which the first electronic device camps is too heavy and load balancing is required, the blind redirection message may be sent to the first electronic device, and the first electronic device may be redirected to another cell after receiving the blind redirection message.

For example, if the first electronic device receives the blind redirection message for the preset number of times within the preset time, it indicates that a blind redirection failure continuously occurs on the first electronic device. In this case, the redirection failure processing apparatus obtains the target information of the N first cells, and determines the access priority of each of the N first cells based on the target information of the N first cells. That is, that the first electronic device receives the blind redirection message for the preset number of times within the preset time is a necessary condition for the redirection failure processing apparatus to perform the redirection failure processing method provided in this embodiment of this application.

Specifically, the blind redirection message is a blind redirection message sent by an original cell of the first electronic device. The blind redirection message is a radio resource control connection release RRC Connection Release message carrying blind redirection information.

It may be understood that if the first electronic device successfully accesses another cell after receiving the blind redirection message, the blind redirection message sent by the original cell is no longer received.

For example, after a redirection failure continuously occurs on the first electronic device, the redirection failure processing apparatus searches for a cell signal in a peripheral range, establishes a frequency library based on a frequency of a cell satisfying an S criterion, and prioritizes frequencies in the frequency library.

It should be noted that the cell satisfying the S criterion is a cell in which a received power Srxlev>0 dB in the cell search and received signal quality Squal>0 dB in the cell search.

Step 202: The redirection failure processing apparatus accesses a target cell.

The target cell is a cell with a highest access priority in the N first cells, and access priorities of the N first cells are determined based on an access success rate of each of the N first cells in a blind redirection process.

For example, to prevent the redirection failure processing apparatus from re-accessing a cell in which a redirection failure occurs on the first electronic device after a redirection failure continuously occurs on the first electronic device, the access priority of each of the N first cells is determined based on the access success rate of each first cell in the blind redirection process.

For example, the access success rate of the first cell is an access success rate within a first preset time before the redirection failure processing apparatus obtains the target information of the N first cells.

In this way, when a first electronic device receives a blind redirection message for a preset number of times within a preset time, target information of N first cells is obtained and a target cell with a highest access priority in the N first cells is accessed, so that when a blind redirection failure occurs on an electronic device, the electronic device can actively intervene and select one reliable cell for access, thereby improving redirection reliability of the electronic device and preventing the electronic device from being disconnected from a network because the electronic device cannot camp on a cell for a long time.

Optionally, in this embodiment of this application, to prevent the electronic device from re-accessing a cell that is accessed during a redirection failure after a redirection failure continuously occurs, the electronic device needs to determine the cell as an abnormal cell.

Figure 5:
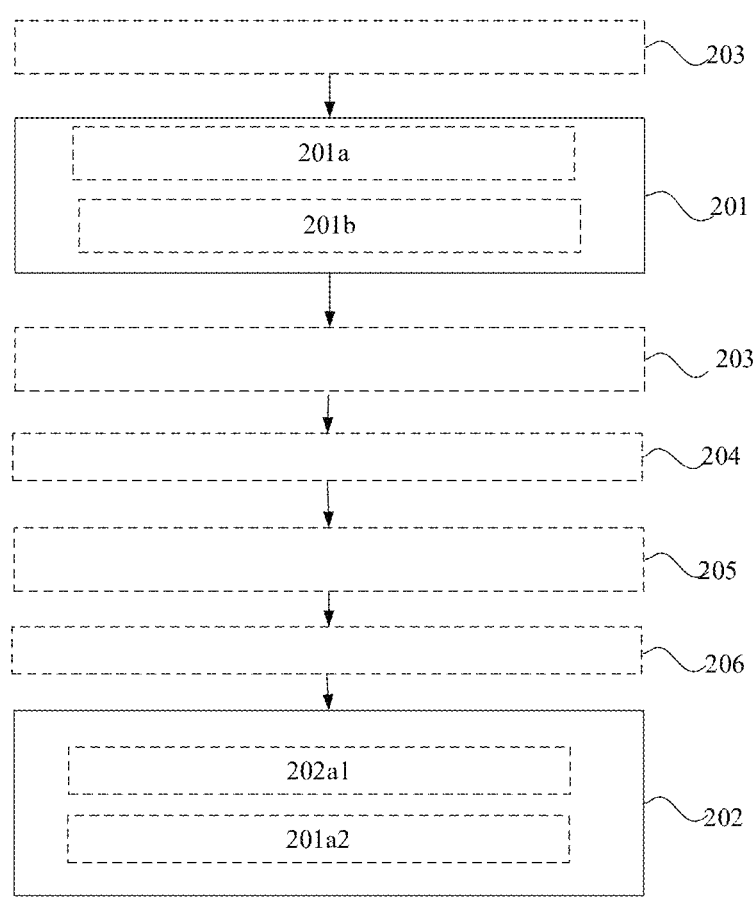
FIG. 5 is a schematic flowchart of a redirection failure processing method according to an embodiment of this application.

For example, as shown in FIG. 5, before step 201, the redirection failure processing method provided in this embodiment of this application may further include the following step 203:

Step 203: The redirection failure processing apparatus determines a second cell as an abnormal cell if the first electronic device receives the blind redirection message for the preset number of times within the preset time.

The second cell is a cell with a highest access priority that fails to be accessed in the N first cells before the blind redirection message is received for the preset number of times within the preset time.

For example, the second cell is a cell with a highest access priority according to a first preset rule during blind redirection of the first electronic device, and after the access priorities of the N first cells are ordered according to a second preset rule, the second cell is not a cell with a highest access priority. Specifically, the second cell is a cell with a lowest access priority in the N first cells.

For example, after the redirection failure processing apparatus determines the second cell as an abnormal cell, the first electronic device or another electronic device may be prevented from accessing the abnormal cell in two manners:

Manner 1:

Optionally, in this embodiment of this application, after the redirection failure processing apparatus determines the second cell as an abnormal cell, the redirection failure processing apparatus may prevent the first electronic device from re-accessing the cell by reducing an access priority of the abnormal cell.

For example, as shown in FIG. 5, after step 201, the redirection failure processing method provided in this embodiment of this application may further include the following step 204:

Step 204: The redirection failure processing apparatus updates an access priority of the second cell in the N first cells from a first priority to a second priority.

The second priority is lower than the first priority.

For example, after the redirection failure processing apparatus determines the second cell as an abnormal cell, the access priority of the second cell may be reduced to a cell with a lowest access priority in the N first cells, so that the redirection failure processing apparatus is prevented from accessing the second cell when accessing a new cell.

In this way, the redirection failure processing apparatus determines a cell in which a redirection failure continuously occurs on an electronic device as an abnormal cell, and prevents the electronic device from re-accessing the cell by reducing an access priority of the cell Manner 2:

Optionally, in this embodiment of this application, after the redirection failure processing apparatus determines the second cell as an abnormal cell, the redirection failure processing apparatus may share abnormality information of the abnormal cell with another electronic device by sending the abnormality information of the abnormal cell to a server, thereby preventing the another electronic device from accessing the abnormal cell.

For example, as shown in FIG. 5, after step 204, the redirection failure processing method provided in this embodiment of this application may further include the following step 205:

Step 205: The redirection failure processing apparatus sends a first message to a server.

The first message includes first abnormality information of the second cell, and the first message is used by the server to share the first abnormality information of the second cell with a second electronic device.

For example, the second electronic device is an electronic device capable of receiving the first abnormality information sent by the server, and the second electronic device may include the first electronic device.

For example, the first abnormality information may include at least one of the following: a time at which a blind redirection abnormality occurs, signal strength of a cell when a blind redirection abnormality occurs, and signal quality of a cell when a blind redirection abnormality occurs.

For example, after a redirection failure continuously occurs on the first electronic device, the redirection failure processing apparatus sends a tracking area identity (tracking area identity, TAI), a global cell identity (Identity, ID), time information, signal strength (for example, a reference signal received power (reference signal receiving power, RSRP)), and signal quality (reference signal receiving quality, RSRQ) of the second cell to the server.

For example, an abnormality probability threshold is set on the server, and if the abnormality information of the abnormal cell exceeds the abnormality probability threshold after the server receives the abnormality information of the abnormal cell, the server sends the abnormality information of the abnormal cell to another electronic device, for example, the first electronic device. In this way, after receiving the abnormality information of the cell, the first electronic device sets the abnormal cell as the last one in a cell list satisfying the S criterion in a frequency sweeping result, and sets a reselection priority of the abnormal cell as the lowest in the list when receiving a system message of another normal cell.

For example, the electronic device sharing the abnormality information of the abnormal cell may be an electronic device in a same tracking area (tracking area, TA). When the first electronic device sends the first message to the server, the first message further includes a tracking area identity (tracking area identity, TAI) of a tracking area in which the first electronic device is located.

In this way, after the redirection failure processing apparatus sends the first message carrying abnormality information of an abnormal cell to the server, the server may share the abnormality information with another electronic device to prevent the another electronic device from accessing the cell.

Further, optionally, in this embodiment of this application, the redirection failure processing apparatus may further receive cell abnormality information shared by another electronic device, thereby preventing the first electronic device from accessing the abnormal cell.

For example, as shown in FIG. 5, step 201 may include the following step 201*a* and step 201*b*:

Step 201*a*: The redirection failure processing apparatus receives a second message sent by the server.

The second message includes second abnormality information of each of M first cells in the N first cells, M≤N, and M≥1.

Step 201*b*: The redirection failure processing apparatus determines the access priority of each of the N first cells based on the second abnormality information of each of the M first cells and system information of each of the N first cells.

The M first cells are cells that fail to be accessed by an electronic device in a blind redirection process. The second abnormality information includes at least one of the following: a time period in which a blind redirection abnormality occurs, a signal strength range of a cell when a blind redirection abnormality occurs, and a signal quality range of a cell when a blind redirection abnormality occurs. The second abnormality information is obtained based on the first abnormality information.

For example, the electronic device may be an electronic device including the first electronic device, that is, the first electronic device and the another electronic device that share cell abnormality information with the server.

For example, after receiving the first abnormality information of the abnormal cell sent by the electronic device, the server generates the second abnormality information based on the first abnormality information, and when the first electronic device considers a cell corresponding to the second abnormality information as a cell to be accessed, the server sends the second abnormality information to the first electronic device.

It should be noted that system information (system information) of the first cell is information obtained when the electronic device measures the cell, and includes 12 system information blocks (system information block, SIB). A SIB3 and a SIB5 are mainly used in this embodiment of this application.

In this way, the redirection failure processing apparatus can also prevent an electronic device from accessing an abnormal cell by receiving cell abnormality information shared by another electronic device.

Optionally, in this embodiment of this application, when a blind redirection failure continuously occurs, the redirection failure processing apparatus may not only independently determine a cell to be accessed, but also give the user a selection right to select a cell to be accessed.

For example, the target cell may be alternatively a first cell accessed by the first electronic device based on user selection in the N first cells. The target information further includes state information.

For example, as shown in FIG. 5, before step 202, the redirection failure processing method provided in this embodiment of this application may further include the following step 206:

Step 206: The redirection failure processing apparatus displays N identifiers and state information corresponding to each identifier.

One identifier indicates one of the N first cells, and the state information is used to indicate network quality of a first cell.

For example, the state information may include at least one of the following: signal strength, signal quality, and a number of interruption times.

For example, after the redirection failure processing apparatus displays a target interface, as shown in FIG. 5, step 202 may include the following step 202a1 and step 202a2:

Step 202a1: The redirection failure processing apparatus receives a selection input performed by a user on a target identifier in the N identifiers.

For example, the selection input may be a touch input performed by the user on the target identifier, a voice instruction that is input by the user, or a specific gesture that is input by the user. This may be specifically determined based on an actual use requirement, and is not limited in this embodiment of the present invention. For example, the touch input may be a drag input performed by the user on a first identifier, and the drag input is used to adjust a display location of the target identifier in the N identifiers and further adjust an access priority of the target identifier in the N identifiers.

Step 202a2: In response to the selection input, the redirection failure processing apparatus accesses a first cell indicated by the target identifier.

For example, a setting interface is further provided in this embodiment of this application, and a first option and a second option are displayed on the setting interface. If an input performed by the user on the first option is received, after step 201, the redirection failure processing apparatus displays the target interface. If an input performed by the user on the second option is received, after step 201, the redirection failure processing apparatus directly accesses the target cell. The first option is a manual processing option, and the second option is an automatic processing option. After the user selects the manual processing option, if the redirection failure processing apparatus does not receive any input from the user within a second preset time after the redirection failure processing apparatus displays the target interface, the redirection failure processing apparatus directly accesses the target cell.

For example, after the redirection failure processing apparatus displays the target interface, the redirection failure processing apparatus displays N first identities in a first order based on access priorities of first cells indicated by the N first identities. After the redirection failure processing apparatus receives a drag input performed by the user on the target identifier, in response to the drag input, the redirection failure processing apparatus may further reorder, based on a second order of the N first identifiers updated by the target identifier, the access priorities of the first cells indicated by the N first identifiers displayed on the target interface. The redirection failure processing apparatus may access the target cell based on the access priorities that are of the N first cells and that correspond to the second order.

For example, a manual selection interface (that is, the target interface) shown in FIG. 2 shows a comparison chart of identifiers (an identifier 21, an identifier 22, and an identifier 23) of three cells (a cell A, a cell B, and a cell C) searched by the electronic device, and specific values of signal strength, signal quality, numbers of interruption times, and recommendation indexes of the three cells. Access priorities of the three cells are cell A>cell B>cell C. The user may tap any one of the three identifiers, so that the electronic device accesses a cell corresponding to the identifier. Meanwhile, the user may further adjust the access priorities of the three cells by dragging the three identifiers.

It should be noted that the manual access manner provided in this embodiment of this application may also be used as a debugging mode. For example, after an abnormality occurs in a cell and is repaired by a technician, the technician may select to access the abnormal cell through manual access, and test whether the cell is normal.

In this way, the redirection failure processing apparatus may further display state information of an accessible cell to the user and access a new cell based on the user selection.

According to the redirection failure processing method provided in this embodiment of this application, when an electronic device receives a blind redirection message for a preset number of times within a preset time, target information of N first cells is obtained and a target cell with a highest access priority in the N first cells is accessed, so that when a blind redirection failure occurs on the electronic device, the electronic device can actively intervene and select one reliable cell for access. A priority of an abnormal cell in the N first cells may be reduced based on cell abnormality information shared by another electronic device, so that the electronic device is prevented from accessing the abnormal cell, thereby improving redirection reliability of the electronic device and preventing the electronic device from being disconnected from a network because the electronic device cannot camp on a cell for a long time.

It should be noted that the redirection failure processing method provided in the embodiments of this application may be performed by a redirection failure processing apparatus or a control module that is in the redirection failure processing apparatus and that is configured to perform the redirection failure processing method. In the embodiments of this application, that the redirection failure processing apparatus performs the redirection failure processing method is used as an example to describe the redirection failure processing apparatus provided in the embodiments of this application.

It should be noted that in the embodiments of this application, the above-mentioned methods are illustrated in the accompanying drawings. The redirection failure processing method is illustrated with reference to one of the accompanying drawings in the embodiments of this application. In specific implementation, the redirection failure processing method shown in the foregoing accompanying drawings of the method may be further implemented with reference to any other accompanying drawings that may be combined shown in the foregoing embodiments. Details are not described herein again.

Figure 3:
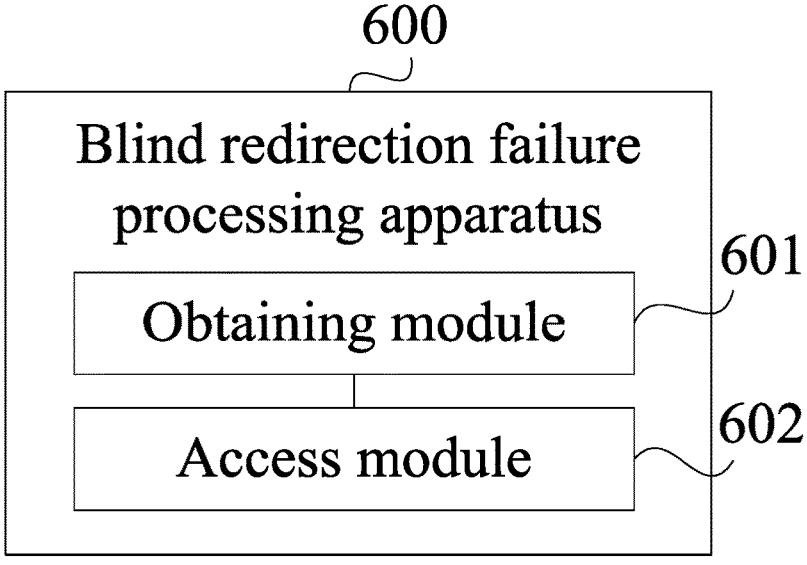
FIG. 3 is a schematic structural diagram of a redirection failure processing apparatus according to an embodiment of this application.

FIG. 3 is a possible schematic structural diagram of a redirection failure processing apparatus according to an embodiment of this application. As shown in FIG. 3, a redirection failure processing apparatus 600 includes an obtaining module 601 and an access module 602. The obtaining module 601 is configured to obtain target information of N first cells in a case that a blind redirection message is received for a preset number of times within a preset time, where the N first cells are N cells that can be searched by a first electronic device, the target information is used to determine an access priority of each of the N first cells, and N≥1; and the access module 602 is configured to access a target cell, where the target cell is a cell with a highest access priority in the N first cells, and access priorities of the N first cells are determined based on an access success rate of each of the N first cells in a blind redirection process.

Figure 6:
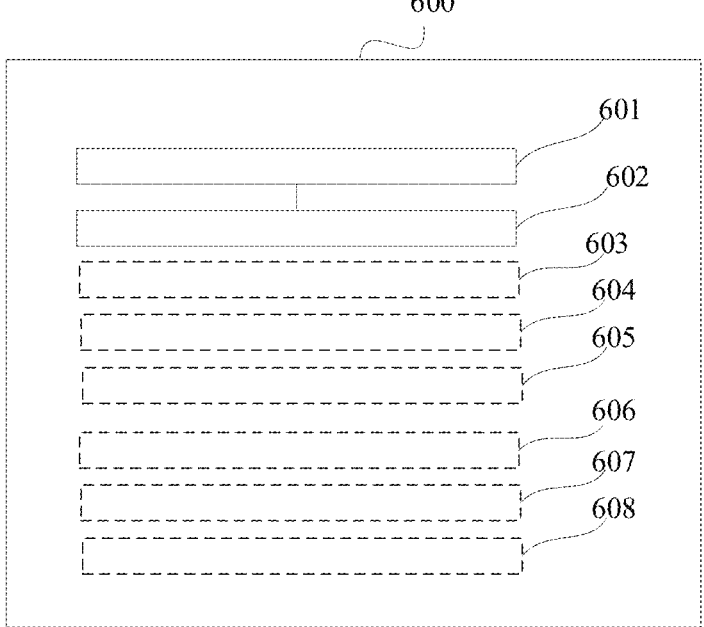
FIG. 6 is a schematic structural diagram of a redirection failure processing apparatus according to an embodiment of this application.

Optionally, as shown in FIG. 6, the redirection failure processing apparatus 600 further includes a determining module 603. The determining module 603 is configured to determine a second cell as an abnormal cell if the first electronic device receives the blind redirection message for the preset number of times within the preset time, where the second cell is a cell with a highest access priority that fails to be accessed in the N first cells before the blind redirection message is received for the preset number of times within the preset time.

Optionally, as shown in FIG. 6, the redirection failure processing apparatus 600 further includes a sending module 604. The sending module 604 is configured to send a first message to a server, where the first message includes first abnormality information of the second cell, and the first message is used by the server to share the first abnormality information of the second cell with a second electronic device; and the first abnormality information includes at least one of the following: a time at which a blind redirection abnormality occurs, signal strength of a cell when a blind redirection abnormality occurs, and signal quality of a cell when a blind redirection abnormality occurs.

Optionally, as shown in FIG. 6, the redirection failure processing apparatus 600 further includes a receiving module 605. The receiving module 605 is configured to receive a second message sent by a server, where the second message includes second abnormality information of each of M first cells in the N first cells, M≤N, and M≥1; and the determining module 603 is further configured to determine the access priority of each of the N first cells based on the second abnormality information that is of each of the M first cells and that is received by the receiving module 605 and system information of each of the N first cells, where the M first cells are cells that fail to be accessed by an electronic device in a blind redirection process, and the second abnormality information includes at least one of the following: a time period in which a blind redirection abnormality occurs, a signal strength range of a cell when a blind redirection abnormality occurs, and a signal quality range of a cell when a blind redirection abnormality occurs.

Optionally, as shown in FIG. 6, the redirection failure processing apparatus 600 further includes an adjustment module 606. The adjustment module 606 is configured to update an access priority of the second cell in the N first cells from a first priority to a second priority, where the second priority is lower than the first priority.

Optionally, as shown in FIG. 6, the redirection failure processing apparatus 600 further includes a display module 607 and a user input module 608. The target cell is a first cell accessed by the first electronic device based on user selection in the N first cells. The display module 607 is configured to display N identifiers and state information corresponding to each identifier, where one identifier indicates one of the N first cells, and the state information is used to indicate network quality of a first cell; the user input module 608 is configured to receive a selection input performed by a user on a target identifier in the N identifiers displayed by the display module 607; and the access module 602 is specifically configured to: in response to the selection input received by the user input module 608, access a first cell indicated by the target identifier.

The redirection failure processing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic terminal, a wearable device, an ultra-mobile personal computer (ultra-mobile personal computer, UMPC), a netbook, or a personal digital assistant (personal digital assistant, PDA). The non-mobile electronic device may be a server, a network attached storage (Network Attached Storage, NAS), a personal computer (personal computer, PC), a television (television, TV), an automated teller machine, or a self-service machine. This is not specifically limited in this embodiment of this application.

The redirection failure processing apparatus in this embodiment of this application may be an apparatus with an operating system. The operating system may be an Android (Android) operating system, an iOS operating system, or another possible operating system. This is not specifically limited in the embodiments of this application.

The redirection failure processing apparatus provided in this embodiment of this application can implement the processes implemented by the redirection failure processing apparatus in the method embodiments in FIG. 1 and FIG. 2. To avoid repetition, details are not described herein again.

According to the redirection failure processing apparatus provided in this embodiment of this application, when an electronic device receives a blind redirection message for a preset number of times within a preset time, target information of N first cells is obtained and a target cell with a highest access priority in the N first cells is accessed, so that when a blind redirection failure occurs on the electronic device, the electronic device can actively intervene and select one reliable cell for access. A priority of an abnormal cell in the N first cells may be reduced based on cell abnormality information shared by another electronic device, so that the electronic device is prevented from accessing the abnormal cell, thereby improving redirection reliability of the electronic device and preventing the electronic device from being disconnected from a network because the electronic device cannot camp on a cell for a long time.

Optionally, an embodiment of this application further provides an electronic device, including a processor 110, a memory 109, and a program or an instruction that is stored in the memory 109 and that can run on the processor 110. When the program or the instruction is executed by the processor 110, the processes of the above redirection failure processing method embodiment is implemented and a same technical effect can be achieved. To avoid repetition, details are not described herein again.

It should be noted that the electronic device in this embodiment of this application includes the foregoing mobile electronic device and the foregoing non-mobile electronic device.

Figure 4:
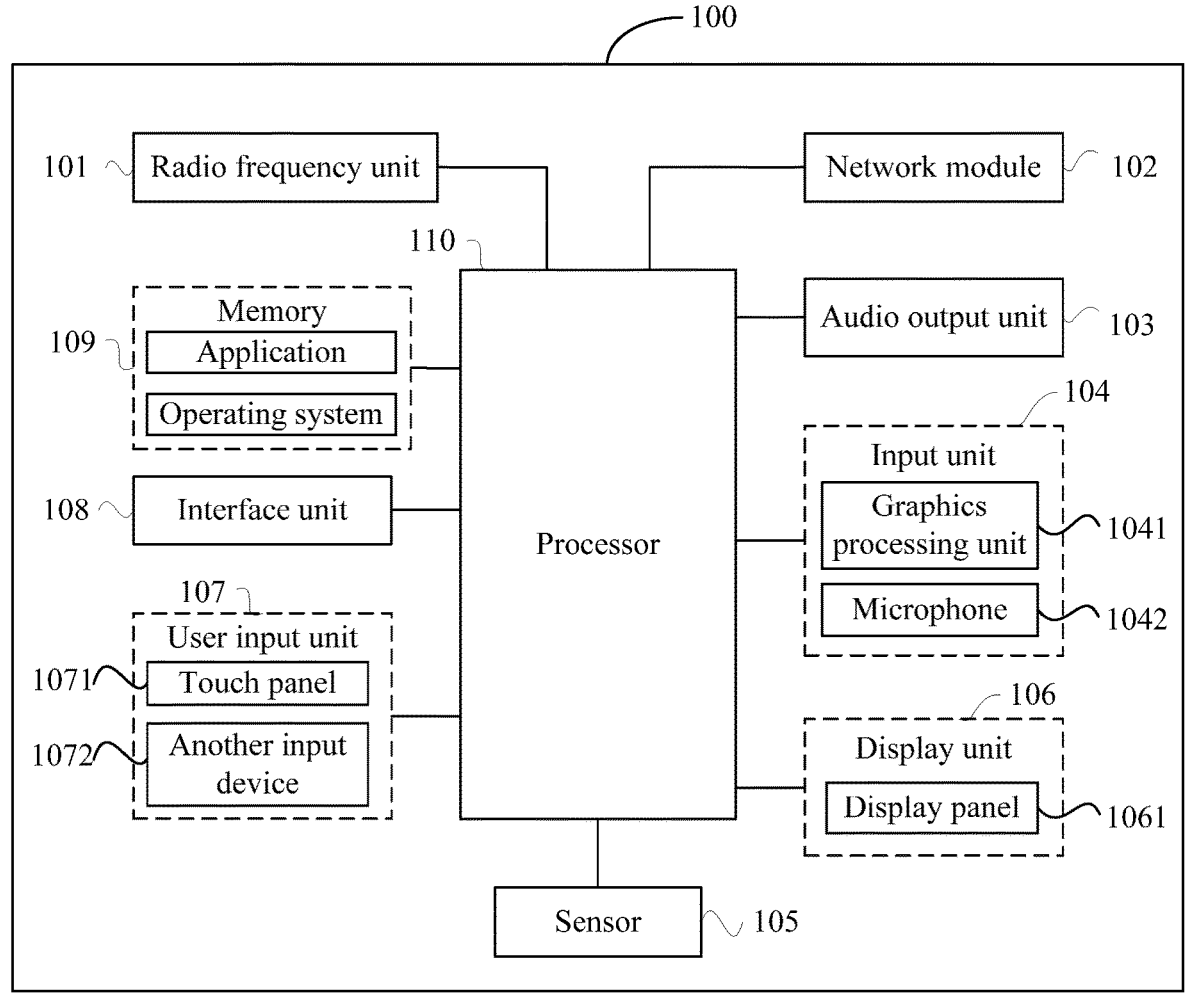
FIG. 4 is a schematic structural diagram of an electronic device according to an embodiment of this application.

FIG. 4 is a schematic diagram of a hardware structure of an electronic device for implementing the embodiments of this application.

An electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 4 does not constitute a limitation on the electronic device. The electronic device may include components more or fewer than those shown in the diagram, a combination of some components, or different component arrangements. Details are not described herein.

The radio frequency unit 101 is configured to obtain target information of N first cells if a first electronic device receives a blind redirection message for a preset number of times within a preset time, where the N first cells are N cells that can be searched by the first electronic device, the target information is used to determine an access priority of each of the N first cells, and N≥1; and the network module 102 is configured to access a target cell, where the target cell is a cell with a highest access priority in the N first cells, and access priorities of the N first cells are determined based on an access success rate of each of the N first cells in a blind redirection process.

In this way, when a first electronic device receives a blind redirection message for a preset number of times within a preset time, target information of N first cells is obtained and a target cell with a highest access priority in the N first cells is accessed, so that when a blind redirection failure occurs on an electronic device, the electronic device can actively intervene and select one reliable cell for access, thereby improving redirection reliability of the electronic device and preventing the electronic device from being disconnected from a network because the electronic device cannot camp on a cell for a long time.

Optionally, the processor 110 is configured to determine a second cell as an abnormal cell if the first electronic device receives the blind redirection message for the preset number of times within the preset time, where the second cell is a cell with a highest access priority that fails to be accessed in the N first cells before the blind redirection message is received for the preset number of times within the preset time.

Optionally, the radio frequency unit 101 is configured to send a first message to a server, where the first message includes first abnormality information of the second cell, and the first message is used by the server to share the first abnormality information of the second cell with a second electronic device; and the first abnormality information includes at least one of the following: a time at which a blind redirection abnormality occurs, signal strength of a cell when a blind redirection abnormality occurs, and signal quality of a cell when a blind redirection abnormality occurs.

In this way, after the redirection failure processing apparatus sends the first message carrying abnormality information of an abnormal cell to the server, the server may share the abnormality information with another electronic device to prevent the another electronic device from accessing the cell.

Optionally, the radio frequency unit 101 is configured to receive a second message sent by a server, where the second message includes second abnormality information of each of M first cells in the N first cells, M≤N, and M≥1; and the processor 110 is further configured to determine the access priority of each of the N first cells based on the second abnormality information that is of each of the M first cells and that is received by the radio frequency unit 101 and system information of each of the N first cells, where the M first cells are cells that fail to be accessed by an electronic device in a blind redirection process, and the second abnormality information includes at least one of the following: a time period in which a blind redirection abnormality occurs, a signal strength range of a cell when a blind redirection abnormality occurs, and a signal quality range of a cell when a blind redirection abnormality occurs.

In this way, the redirection failure processing apparatus can also prevent an electronic device from accessing an abnormal cell by receiving cell abnormality information shared by another electronic device.

Optionally, the processor 110 is configured to update an access priority of the second cell in the N first cells from a first priority to a second priority, where the second priority is lower than the first priority.

In this way, the redirection failure processing apparatus determines a cell in which a redirection failure continuously occurs on an electronic device as an abnormal cell, and prevents the electronic device from re-accessing the cell by reducing an access priority of the cell.

Optionally, the display unit 106 and the user input unit 107 are further included. The target cell is a first cell accessed by the first electronic device based on user selection in the N first cells. The display unit 106 is configured to display N identifiers and state information corresponding to each identifier, where one identifier indicates one of the N first cells, and the state information is used to indicate network quality of a first cell; the user input unit 107 is configured to receive a selection input performed by a user on a target identifier in the N identifiers displayed by the display unit 106; and the network module 102 is specifically configured to: in response to the selection input received by the user input unit 107, access a first cell indicated by the target identifier.

In this way, the redirection failure processing apparatus may further display state information of an accessible cell to the user and access a new cell based on the user selection.

According to the electronic device provided in this embodiment of this application, when the electronic device receives a blind redirection message for a preset number of times within a preset time, target information of N first cells is obtained and a target cell with a highest access priority in the N first cells is accessed, so that when a blind redirection failure occurs on the electronic device, the electronic device can actively intervene and select one reliable cell for access. A priority of an abnormal cell in the N first cells may be reduced based on cell abnormality information shared by another electronic device, so that the electronic device is prevented from accessing the abnormal cell, thereby improving redirection reliability of the electronic device and preventing the electronic device from being disconnected from a network because the electronic device cannot camp on a cell for a long time.

It should be understood that, in this embodiment of this application, the input unit 104 may include a graphics processing unit (Graphics Processing Unit, GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It can be understood that, alternatively, the modem processor may not be integrated into the processor 110.

An embodiment of this application further provides a readable storage medium. The readable storage medium stores a program or an instruction, and when the program or the instruction is executed by a processor, the processes of the foregoing redirection failure processing method embodiment are implemented and a same technical effect can be achieved. To avoid repetition, details are not described herein again.

The processor is a processor in the electronic device in the foregoing embodiment. The readable storage medium includes a computer-readable storage medium, such as a computer read-only memory (Read-Only Memory, ROM), a random access memory (Random Access Memory, RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing redirection failure processing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing an electronic device (which may be a mobile phone, a computer, a server, an air conditioner, a network device, or the like) to perform the methods in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A redirection failure processing method, wherein the method comprises:

obtaining target information of N first cells in a case that a blind redirection message is received for a preset number of times within a preset time, wherein the N first cells are N cells that can be searched by a first electronic device, the target information is used to determine an access priority of each of the N first cells, and N≥1; and accessing a target cell, wherein the target cell is a cell with a highest access priority in the N first cells, and access priorities of the N first cells are determined based on an access success rate of each of the N first cells in a blind redirection process;

wherein before the obtaining target information of N first cells, the method further comprises:

determining a second cell as an abnormal cell if the first electronic device receives the blind redirection message for the preset number of times within the preset time, wherein the second cell is a cell with a highest access priority that fails to be accessed in the N first cells before the blind redirection message is received for the preset number of times within the preset time.

2. The method according to claim 1, wherein after the determining a second cell as an abnormal cell, the method further comprises:

sending a first message to a server, wherein the first message comprises first abnormality information of the second cell, and the first message is used by the server to share the first abnormality information of the second cell with a second electronic device; and the first abnormality information comprises at least one of the following: a time at which a blind redirection abnormality occurs, signal strength of a cell when a blind redirection abnormality occurs, and signal quality of a cell when a blind redirection abnormality occurs.

3. The method according to claim 1, wherein the obtaining target information of N first cells comprises:

receiving a second message sent by a server, wherein the second message comprises second abnormality information of each of M first cells in the N first cells, M≤N, and M≥1; and determining the access priority of each of the N first cells based on the second abnormality information of each of the M first cells and system information of each of the N first cells, wherein the M first cells are cells that fail to be accessed by an electronic device in a blind redirection process, and the second abnormality information comprises at least one of the following: a time period in which a blind redirection abnormality occurs, a signal strength range of a cell when a blind redirection abnormality occurs, and a signal quality range of a cell when a blind redirection abnormality occurs.

4. The method according to claim 1, wherein after the obtaining target information of N first cells, the method further comprises:

updating an access priority of the second cell in the N first cells from a first priority to a second priority, wherein the second priority is lower than the first priority.

5. The method according to claim 1, wherein the target cell is a first cell accessed by the first electronic device based on user selection in the N first cells, and the target information further comprises state information;

before the accessing a target cell, the method further comprises:

displaying N identifiers and state information corresponding to each identifier, wherein one identifier indicates one of the N first cells, and the state information is used to indicate network quality of a first cell; and the accessing a target cell comprises:

receiving a selection input performed by a user on a target identifier in the N identifiers; and in response to the selection input, accessing a first cell indicated by the target identifier.

6. An electronic device, comprising a processor, a memory, and a program or an instruction that is stored in the memory and that can run on the processor, wherein the program or the instruction is executed by the processor to perform:

obtaining target information of N first cells in a case that a blind redirection message is received for a preset number of times within a preset time, wherein the N first cells are N cells that can be searched by a first electronic device, the target information is used to determine an access priority of each of the N first cells, and N≥1; and accessing a target cell, wherein the target cell is a cell with a highest access priority in the N first cells, and access priorities of the N first cells are determined based on an access success rate of each of the N first cells in a blind redirection process;

wherein before the obtaining target information of N first cells, the program or the instruction is executed by the processor to perform:

determining a second cell as an abnormal cell if the first electronic device receives the blind redirection message for the preset number of times within the preset time, wherein the second cell is a cell with a highest access priority that fails to be accessed in the N first cells before the blind redirection message is received for the preset number of times within the preset time.

7. The electronic device according to claim 6, wherein after the determining a second cell as an abnormal cell, the program or the instruction is executed by the processor to perform:

sending a first message to a server, wherein the first message comprises first abnormality information of the second cell, and the first message is used by the server to share the first abnormality information of the second cell with a second electronic device; and the first abnormality information comprises at least one of the following: a time at which a blind redirection abnormality occurs, signal strength of a cell when a blind redirection abnormality occurs, and signal quality of a cell when a blind redirection abnormality occurs.

8. The electronic device according to claim 6, wherein when obtaining target information of N first cells, the program or the instruction is executed by the processor to perform:

receiving a second message sent by a server, wherein the second message comprises second abnormality information of each of M first cells in the N first cells, M≤N, and M≥1; and determining the access priority of each of the N first cells based on the second abnormality information of each of the M first cells and system information of each of the N first cells, wherein the M first cells are cells that fail to be accessed by an electronic device in a blind redirection process, and the second abnormality information comprises at least one of the following: a time period in which a blind redirection abnormality occurs, a signal strength range of a cell when a blind redirection abnormality occurs, and a signal quality range of a cell when a blind redirection abnormality occurs.

9. The electronic device according to claim 6, wherein after the obtaining target information of N first cells, the program or the instruction is executed by the processor to perform:

updating an access priority of the second cell in the N first cells from a first priority to a second priority, wherein the second priority is lower than the first priority.

10. The electronic device according to claim 6, wherein the target cell is a first cell accessed by the first electronic device based on user selection in the N first cells, and the target information further comprises state information;

before the accessing a target cell, the program or the instruction is executed by the processor to perform:

displaying N identifiers and state information corresponding to each identifier, wherein one identifier indicates one of the N first cells, and the state information is used to indicate network quality of a first cell; and when accessing a target cell, the program or the instruction is executed by the processor to perform:

receiving a selection input performed by a user on a target identifier in the N identifiers; and in response to the selection input, accessing a first cell indicated by the target identifier.

11. A non-transitory readable storage medium, wherein the readable storage medium stores a program or an instruction, wherein the program or the instruction is executed by a processor to perform:

obtaining target information of N first cells in a case that a blind redirection message is received for a preset number of times within a preset time, wherein the N first cells are N cells that can be searched by a first electronic device, the target information is used to determine an access priority of each of the N first cells, and N≥1; and accessing a target cell, wherein the target cell is a cell with a highest access priority in the N first cells, and access priorities of the N first cells are determined based on an access success rate of each of the N first cells in a blind redirection process;

wherein before the obtaining target information of N first cells, the program or the instruction is executed by the processor to perform:

determining a second cell as an abnormal cell if the first electronic device receives the blind redirection message for the preset number of times within the preset time, wherein the second cell is a cell with a highest access priority that fails to be accessed in the N first cells before the blind redirection message is received for the preset number of times within the preset time.

12. The non-transitory readable storage medium according to claim 11, wherein after the determining a second cell as an abnormal cell, the program or the instruction is executed by the processor to perform:

sending a first message to a server, wherein the first message comprises first abnormality information of the second cell, and the first message is used by the server to share the first abnormality information of the second cell with a second electronic device; and the first abnormality information comprises at least one of the following: a time at which a blind redirection abnormality occurs, signal strength of a cell when a blind redirection abnormality occurs, and signal quality of a cell when a blind redirection abnormality occurs.

13. The non-transitory readable storage medium according to claim 11, wherein when obtaining target information of N first cells, the program or the instruction is executed by the processor to perform:

receiving a second message sent by a server, wherein the second message comprises second abnormality information of each of M first cells in the N first cells, M≤N, and M≥1; and determining the access priority of each of the N first cells based on the second abnormality information of each of the M first cells and system information of each of the N first cells, wherein the M first cells are cells that fail to be accessed by an electronic device in a blind redirection process, and the second abnormality information comprises at least one of the following: a time period in which a blind redirection abnormality occurs, a signal strength range of a cell when a blind redirection abnormality occurs, and a signal quality range of a cell when a blind redirection abnormality occurs.

14. The non-transitory readable storage medium according to claim 11, wherein after the obtaining target information of N first cells, the program or the instruction is executed by the processor to perform:

updating an access priority of the second cell in the N first cells from a first priority to a second priority, wherein the second priority is lower than the first priority.

15. The non-transitory readable storage medium according to claim 11, wherein the target cell is a first cell accessed by the first electronic device based on user selection in the N first cells, and the target information further comprises state information;

before the accessing a target cell, the program or the instruction is executed by the processor to perform:

displaying N identifiers and state information corresponding to each identifier, wherein one identifier indicates one of the N first cells, and the state information is used to indicate network quality of a first cell; and when accessing a target cell, the program or the instruction is executed by the processor to perform:

receiving a selection input performed by a user on a target identifier in the N identifiers; and in response to the selection input, accessing a first cell indicated by the target identifier.

16. A chip, wherein the chip comprises a processor and a communication interface, the communication interface is coupled to the processor, and the processor is configured to run a program or an instruction to implement the redirection failure processing method according to claim 1.

* * * * *